United States Patent
Pesterev et al.

(10) Patent No.: US 8,606,498 B2
(45) Date of Patent: Dec. 10, 2013

(54) PATH APPROXIMATION FOR PLANAR MOTION OF A GROUND VEHICLE

(75) Inventors: Alexander V. Pesterev, Moscow (RU); Lev B. Rapoport, Moscow (RU); Michael Tkachenko, Moscow (RU)

(73) Assignee: Javad GNSS, Inc., San Jose, CA (US)

( * ) Notice: Subject to any disclaimer, the term of this patent is extended or adjusted under 35 U.S.C. 154(b) by 1413 days.

(21) Appl. No.: 12/070,333

(22) Filed: Feb. 15, 2008

(65) Prior Publication Data

US 2008/0208454 A1 Aug. 28, 2008

Related U.S. Application Data

(60) Provisional application No. 60/901,879, filed on Feb. 16, 2007.

(51) Int. Cl.
*G01C 21/00* (2006.01)
*G01C 21/26* (2006.01)

(52) U.S. Cl.
CPC ...................................... *G01C 21/26* (2013.01)
USPC .......................................... 701/400; 701/409

(58) Field of Classification Search
None
See application file for complete search history.

(56) References Cited

U.S. PATENT DOCUMENTS

| | | | |
|---|---|---|---|
| 4,727,492 A | 2/1988 | Reeve et al. | |
| 5,648,901 A | 7/1997 | Gudat et al. | |
| 7,084,882 B1 * | 8/2006 | Dorum et al. | 345/589 |
| 7,209,810 B2 | 4/2007 | Meyer et al. | |
| 7,363,154 B2 | 4/2008 | Lindores | |
| 7,689,354 B2 | 3/2010 | Heiniger et al. | |
| 2006/0224318 A1 * | 10/2006 | Wilson et al. | 701/213 |
| 2007/0083299 A1 | 4/2007 | Lindores | |
| 2007/0085850 A1 * | 4/2007 | Hong et al. | 345/442 |
| 2008/0103694 A1 | 5/2008 | Dix et al. | |
| 2008/0255728 A1 | 10/2008 | Ottenhues et al. | |
| 2010/0185366 A1 | 7/2010 | Heiniger et al. | |
| 2012/0239287 A1 | 9/2012 | Pieper et al. | |

OTHER PUBLICATIONS

Eck et al. (1995). "Local Energy Fairing of B-Spline Curves," *Computing Supplementum 10, Geometric Modeling*, pp. 129-147.
Farin et al. (1987). "Fairing Cubic B-Spline Curves," *Computer Aided Geometric Design* 4:91-103.
Farin. (1992). "Degree Reduction Fairing of Cubic B-Spline Curves," *Geometry Processing for Design and Manufacturing*, SIAM, pp. 87-99.
Kallay. (1993). "Constrained Optimization in Surface Design " *Modeling in Computer Graphics*, B. Falcidien and T.L. Kunii, Eds., Berlin:Springer, pp. 85-93.
Kjellander. (1983). "Smoothing of Cubic Parametric Splines," *Computer Aided Design* 15(3):175-179.

(Continued)

*Primary Examiner* — Ryan Zeender
*Assistant Examiner* — Denisse Ortiz Roman
(74) *Attorney, Agent, or Firm* — Morrison & Foerster LLP

(57) ABSTRACT

The generation of a planar trajectory for use by a vehicle in guiding its position is described. The trajectory is generated by identifying points representing the trajectory, fairing the identified points to generate a set of faired points, and computing a set of polynomial segments from the faired points. The segments form a curve representing the trajectory, where the curve is $C^2$-smooth, and the curve does not exceed the steering capability of the vehicle. The segments may comprise cubic B-spline segments. If the identified points are not substantially equidistant, then an auxiliary curve approximating the trajectory is generated, and a set of substantially equidistant points on the auxiliary curve is selected as the identified points.

14 Claims, 3 Drawing Sheets

(56) References Cited

OTHER PUBLICATIONS

Liu et al. (2002). "Adaptive Fairing of Digitized Point Data with Discrete Curvature," *Computer-Aided Design* 34(1):309-320.

Pesterev et al. (Sep. 4-7, 2007). "Global Energy Fairing of B-Spline Curves in Path Planning Problems," in *Proceedings of the ASME 2007 International Design Engineering Technical Conferences & Computers and Information in Engineering Conference*, Las Vegas, Nevada, USA, pp. 1-7.

Pigounakis et al. (1996). "Convexity Preserving Fairing," *Computer-Aided Design* 28(12):981-994.

Sapidis et al. (1990). "Automatic Fairing Algorithm for B-Spline Curves," *Computer-Aided Design* 22(2):121-129.

Non Final Office Action received for U.S. Appl. No. 12/728,046, mailed only Oct. 4, 2012, 14 pages.

Final Office Action received for U.S. Appl. No. 12/728,046, mailed on Feb. 11, 2013, 14 pages.

\* cited by examiner

PATH APPROXIMATION FOR PLANAR MOTION OF A GROUND VEHICLE

CROSS-REFERENCE TO RELATED APPLICATIONS

This application is a non-provisional patent application of U.S. Provisional Patent Application Ser. No. 60/901,879 with a filing date of Feb. 16, 2007, claiming the benefit under 35 USC 119(e) and incorporated herein by reference in its entirety.

BACKGROUND

There are many applications where a driver or pilot steers a vehicle down an original course that may need to be repeated later. For example, a street sweeper may be steered for a first time on an optimal course around a large parking lot. It would be advantageous to be able to automatically repeat that course to perform regular cleanings thereafter. Similarly, in a security application, a mine laying device may be manually steered over a course planting mines. It would be advantageous to be able to automatically and reliably travel the same path later with a mine clearing vehicle to ensure removal or destruction of the earlier planted mines.

Further, satellite and other broadcast navigation signals, as well as techniques for their processing, have greatly improved in recent years. Such navigation signals and processing now offer degrees of accuracy in position information sufficient to be used in automated vehicle navigation as suggested above. What are needed in the art are apparatus and methods for the efficient use and processing of desired path and position information to facilitate automated navigation along a desired path or trajectory.

BRIEF SUMMARY

Novel methods and apparatus are provided in various aspects of the present invention directed toward the automated navigation of a vehicle along a target trajectory. A set of points represents positions along an actually traveled or planned route for the vehicle and is used as the model path or trajectory to be repeated. The model path data may be progressively accumulated into electronic storage by frequently determining and storing the position of a vehicle as it actually travels the path that is desired to be later repeated. The model path may also result from specifying a desired route for a vehicle from known positional reference information, such as accurate and detailed map data. The model path may also result from processing an earlier model path, for example, to produce a model path optimized for some characteristic. In any event, a model path becomes an input to a method of path planning that produces a preferred approximation of the model path, the preferred approximation called a target path or trajectory.

The path planning method, and associated apparatus, use the model trajectory data to generate a smooth, curvilinear target trajectory that does not exceed the steering capability of the vehicle. The target path is constructed as a sequence of polynomial segments, preferably B-spline segments. having advantageous characteristics. In one preferred method, the target path is constructed from data resulting from first constructing an auxiliary curve approximating the model trajectory, selecting a set of equidistant control points of the auxiliary curve, and applying a fairing procedure to the control point set to reduce or eliminate the effects of measurement errors in the model trajectory data.

Processing logic operates using the target trajectory to generate directional control signal information useful to control the steering of a vehicle having automatic navigation capability, so that the vehicle follows a planned or earlier traveled route with sufficient precision. In a preferred embodiment directional control signals are generated using a determination of the deviation of the current vehicle position from the target trajectory. Such deviation information may include directional control signal information and may include distance and direction information. Determining how far and in what direction, if at all, the vehicle is located from its target path permits meaningful course corrections to be made by generating corresponding control signals to a steering control system to reduce or eliminate the deviation. Efficient method and apparatus for making such determinations are disclosed.

The preferred deviation determination method performs efficient calculation using values characteristic of a particular geometric model. The geometric model of the preferred embodiment comprises a point representing the position of the vehicle, a segment of the target trajectory curve, normals projected from the beginning and ending endpoints of the curve segment, the intersection point of those normals, a line projected from the intersection point across the vehicle position, and angular measurements among the project line and normals. Use of the geometric model values permits fast and efficient determination of the deviation of the vehicle from the target trajectory.

These and other inventive aspects will become apparent by attention to the drawings and the detailed description that follows.

DETAILED DESCRIPTION OF EMBODIMENTS OF THE INVENTION

Figure 1:
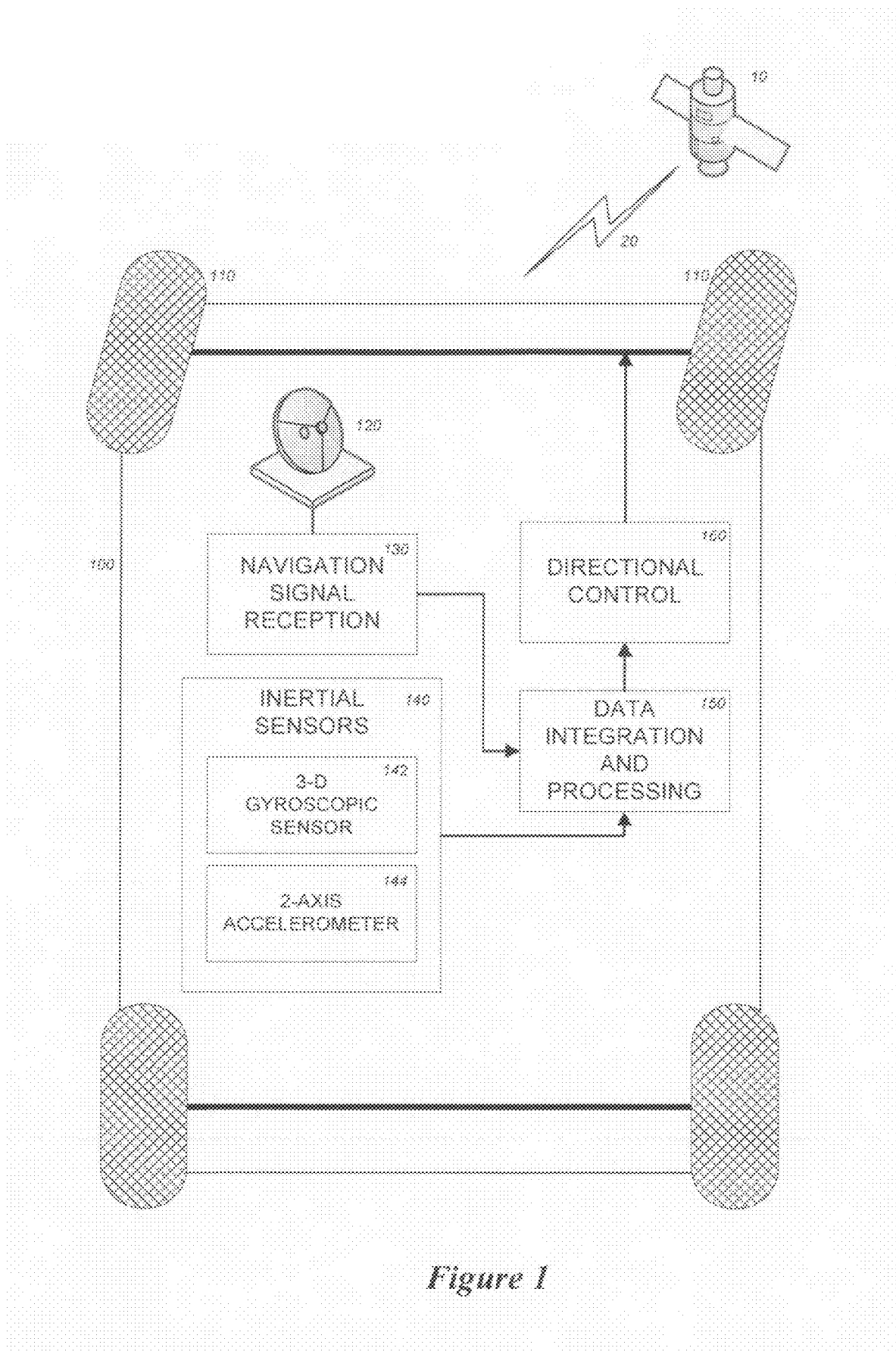
FIG. 1 is a block diagram of one embodiment of a land-based automatic navigation vehicle beneficially employing aspects of the present invention.

The present invention generally relates to the field of automated steering control of a vehicle. The preferred embodiment is described in terms of a ground, or land-based, vehicle, although those skilled in the art will recognize that the present invention is not so limited. Such a vehicle is depicted in FIG. 1 and discussed further below. A preferred embodiment employs a novel path planning method for approximating planar trajectories of a vehicle by a smooth curve in real time. For further reference, please see "Global Energy Fairing of B-Spline Curves in Path Planning Problems," *Proceedings of DETC '07, ASME Design Engineering Technical Conferences*, Sep. 4-7, 2007, Las Vegas, incorporated by reference in its entirety herein. While the physical trajectory may involve movement in a $3^{rd}$ dimension, such as the ups and downs of an uneven stretch of ground, that dimensional aspect can be ignored or handled separately or by extension such that the physical surface trajectory can be represented on a 2D plane for automated navigation employing the present invention.

Trajectories are paths of travel and, in a preferred embodiment, can be represented as a collection of point coordinate data. The point coordinates that define the shape of a path are called control points. In the case of a model trajectory created by sampling the position of a vehicle, the control points defining the trajectory are the collected data points actually located on the path of travel. Other trajectories may comprise point coordinates located off of the associated path of travel that, nonetheless, affect the shape of the travel path. The point data for a faired trajectory, discussed infra, for example, may advantageously comprise control points that do not lie on the associated travel path.

Automatic Navigation Vehicle

FIG. 1 is a block diagram of one embodiment of a land-based automatic navigation vehicle beneficially employing aspects of the present invention. One or more sources of navigation signals 20, such as satellite navigation signaling systems 10, are preferably used for high accuracy positioning of the vehicle 100. Navigation signaling systems 10 may include GPS and GLONASS in a preferred GNSS (Global Navigation Satellite System) framework. The GPS satellite signal standards are set in detail by the *ICD-GPS*-200, *Revision C, ARINC Research Corporation*, 10 *Oct.*, 1993. Details of the GLONASS signals may be found in *GLONASS ICD, Version* 4.0, 1998. Other navigational signals, whether space-, air-, or land-based, may substitute for or supplement these. The antenna 120 of combined GPS and GLONASS navigation receiver 130 is mounted at a specified position, preferably on the roof of the vehicle for the greatest skyward exposure. A three-dimensional gyroscopic sensor 142 is fixed on the body of the vehicle to accurately measure the rate of change of angles. A two-axis accelerometer 144 is used to measure pitch and roll angles of the vehicle. Measurements of the gyroscopic sensor and accelerometer (further referred to as inertial sensors 140) are combined with GNSS-measured position and velocity for additional smoothing of the vehicle position and velocity determinations by data integration and processing apparatus 150. The resulting smoothed position, velocity, and body orientation are preferably obtained using known state-of-the-art filtering recurrent schemes such as Kalman filtering.

The front steering wheels 110 are controlled by a directional control system 160, such as an electronically controlled hydraulic steering mechanism which changes the angle of the front wheels. Other forms of steering may be used, such as differential drive. Regardless of the type of steering or directional control used (herein, steering and directional control are used synonymously), directional control information signals are sent in real time to the directional control system to direct the vehicle to follow a specified planar target trajectory. To achieve the control objective, data integration and processing logic 150 compares the real vehicle position with the target trajectory and finds the distance and direction from the current vehicle location to the desired path, as well as possibly the rate of its variation, producing directional control information signals.

One skilled in the art would understand that data integration and processing logic 150 comprises data processing logic apparatus. In one embodiment, the processing logic apparatus may comprise, for example, a CPU, memory, persistent storage such as flash ROM or disk, I/O circuitry, and stored software program instructions. (The software program instructions themselves are a form of processing logic that is generally used in conjunction with CPU-type processing logic circuitry, and that may advantageously be stored in a computer-readable medium, such as ROM, RAM, or a portable storage medium such as a CD-ROM.) In another embodiment, the processing logic apparatus may comprise, for example, the logic circuits of ASICs or programmable logic devices (PLDs) such as FPGAs and associated memory devices containing logic configuration data. In any case, the processing logic apparatus can read and write data stored in electronically accessible form, operate on data, and preferably generate electronic control signals. A wide variety of means are available to perform data processing on directional control information and related signals useful in the practice of aspects of the present invention.

An automatic navigation vehicle as described in relation to FIG. 1 can be advantageously employed where a path is to be traveled several times. When passing the path for the first time, the vehicle is controlled by a driver, and discrete information about the path is collected by means of GNSS as a set of n points belonging to the traveled trajectory (obtained, e.g., by measuring vehicle positions at discrete moments of time when the vehicle travels the path). This set of collected points represents the model path or trajectory to be subsequently repeated. The set of collected points is an ordered set or series meaning that an ordinal relationship exists among the collected points that is represented as a repeatable, sequential progression from the first point to the last. When a set is a subset of the points, the points in the reduced set preferably retain their relative order one to another as in the greater set. One skilled in the art understands that the particular format and data structure used to store the set of points is not important so long as the points can be identified with the proper relative order one to another. For example, linked lists or binary tree data structures could be used to store the set of points. One skilled in the art further understands that a particular model path may be algorithmically processed, e.g., for a routing optimization, which could change the relative order of the points from that of the original model path. The output of such processing is nonetheless a model path containing an ordered set or series of points for representing a path of travel in the preferred embodiment.

After collection of points in the model trajectory, a continuous approximation of the collected model trajectory is constructed when it is required to smoothly and accurately repeat this path by the same or another vehicle, as many times as needed. This repeatable tracking problem is advantageously solved by means of an automated steering control system which processes the trajectory information in a mathematical form.

In the embodiment depicted in FIG. 1, a method of path planning is employed wherein the mathematical form of a target trajectory is generated by data integration and processing logic 150. Further, the generated target trajectory satisfies the following two criteria. First, the trajectory is admissible, meaning that the trajectory curve has continuous slope and curvature (the turning angle of the driving wheels cannot be changed instantaneously), and the curvature should be less than a specified number (which is due to the fact that the maximum turning angle of the driving wheels is bounded). Second, the mathematical form of the target trajectory makes it efficient to calculate the distance from the vehicle to the desired path, as well as some derivatives. Each represents an advantage of practicing aspects of the present invention.

Further, in a preferred embodiment, the function calculated by data integration and processing logic 150 for the path deviation (the difference between the vehicle location and the desired path) is equal to zero if and only if the current position lies on the desired path (assuming values of opposite signs on the left and on the right of the desired path), and tends to zero when the current position approaches the desired path. In the case of an arbitrary trajectory, the calculation of the distance is a very time-consuming problem, which can be solved only numerically. Accordingly, the computational efficiency of aspects of the present invention represents a worthwhile advantage.

Path Planning

In the preferred embodiment, path planning to produce a target trajectory is performed by software-based electronic processing logic such that the desired path is approximated by a cubic B-spline curve consisting of elementary B-splines, where each elementary B-spline is constructed by four control points, $r_{i-1}$, $r_i$, $r_{i+1}$, and $r_{i+2}$. One embodiment of the invention employs uniform B-splines (in which control points are spaced equidistant from each other). In this case, an elementary B-spline is constructed by the formula $$r^{(i)}(t)=R_i MT(t), \quad \text{Formula (1)}$$

where $r^{(i)}(t)$ is a current point of the i-th spline at t, $R_i$ is the 2-by-4 matrix $R_i=[r_{i-1}, r_i, r_{i+1}, r_{i+2}]$, t is the spline parameter, and M and T(t) are the matrix and vector:

$$M = \frac{1}{6}\begin{bmatrix} 1 & -3 & 3 & -1 \\ 4 & 0 & -6 & 3 \\ 1 & 3 & 3 & -3 \\ 0 & 0 & 0 & 1 \end{bmatrix}, T(t) = \begin{pmatrix} 1 \\ t \\ t^2 \\ t^3 \end{pmatrix}, 0 \le t \le 1. \quad \text{Formula (2)}$$

The points, $r_{i-1}$, $r_i$, $r_{i+1}$, and $r_{i+2}$, are a subset of vehicle position coordinates of a model trajectory and t is a parameter taking values from 0 to 1. In other embodiments, different—non-uniform or non-uniform rational—B-splines can be used (see, e.g., de Boor, C., A Practical Guide to Splines, Springer, N.Y., 1978). Uniform B-splines are preferred because they considerably simplify calculations resulting in explicit formulas of all spline characteristics on the control points and, particularly, reduce complexity of the fairing algorithm described below.

In the preferred embodiment, the curve obtained by combining the elementary splines has second-order parametric continuity, or is $C^2$-smooth. That is to say, at the point where two adjacent elementary splines are connected, they have equal first and second derivatives: $r^{(i)}(1)=r^{(i+1)}(0)$, $\dot{r}^{(i)}(1)=\dot{r}^{(i+1)}(0)$, and $\ddot{r}^{(i)}(1)=\ddot{r}^{(i+1)}(0)$, where the dot denotes differentiation. In particular, this means that the curvature of the combined B-spline curve $$k^{(i)}(t) = \frac{|\dot{r}^{(i)}(t) \times \ddot{r}^{(i)}(t)|}{|\dot{r}^{(i)}(t)|^2}, 0 \le t \le 1, i = 1, 2, \ldots, n-2, \quad \text{Formula (3)}$$

is a continuous function. Here, × denotes the external (vector) product of vectors, and |•| denotes the Euclidean norm of a vector.

The direct construction of a B-spline curve from a model trajectory may result in a poor, or even unacceptable, target trajectory because of measurement errors. Having a greater number of data points for a model trajectory improves approximation accuracy but can magnify the effect of measurement errors on the shape of the resulting target trajectory. In some cases a target trajectory could result with chaotically varying curvature, which, generally, does not satisfy the maximum curvature restriction. In a preferred embodiment, fairing is used to reduce the effect of measurement error. Because known fairing techniques perform better when starting from equidistant control points, a preferred embodiment further includes logic to establish a set of equidistant control points approximating the model trajectory. Such logic can be of considerable advantage where model trajectory data is not readily obtained on a equidistant basis. Such would be the case where an economical data collector on a moving vehicle collects model trajectory data at regular time intervals without the complexity of monitoring its mechanical movements to collect model trajectory data at regular distance intervals.

Generally, the effect of measurement errors can be reduced or eliminated by applying fairing (see, e.g., Sapidis, N. and Farin, G., Automatic Fairing Algorithm for B-Spline Curves, Comp.-Aided Design, 1990, vol. 22, pp. 121-129; Eck, M. and Hadenfeld, J., Local Energy Fairing of B-Spline Curves, Computing Supplementum 10, Geometric Modelling, pp. 129-147, Springer, 1995). Basically, fairing consists in minimizing a certain functional by letting coordinates of the control points vary within a specified small neighborhood (e.g., of radius equal to the average measurement error) and results in a fairer (smoother) curve. However, known fairing procedures rely on the assumption that the actual parameter t of the elementary splines approximately represents spline lengths and are not efficient if the control points are not equidistant as previously mentioned. Accordingly, the advantageous process next described addresses each of these considerations.

Target Trajectory Construction Process

Figure 2:
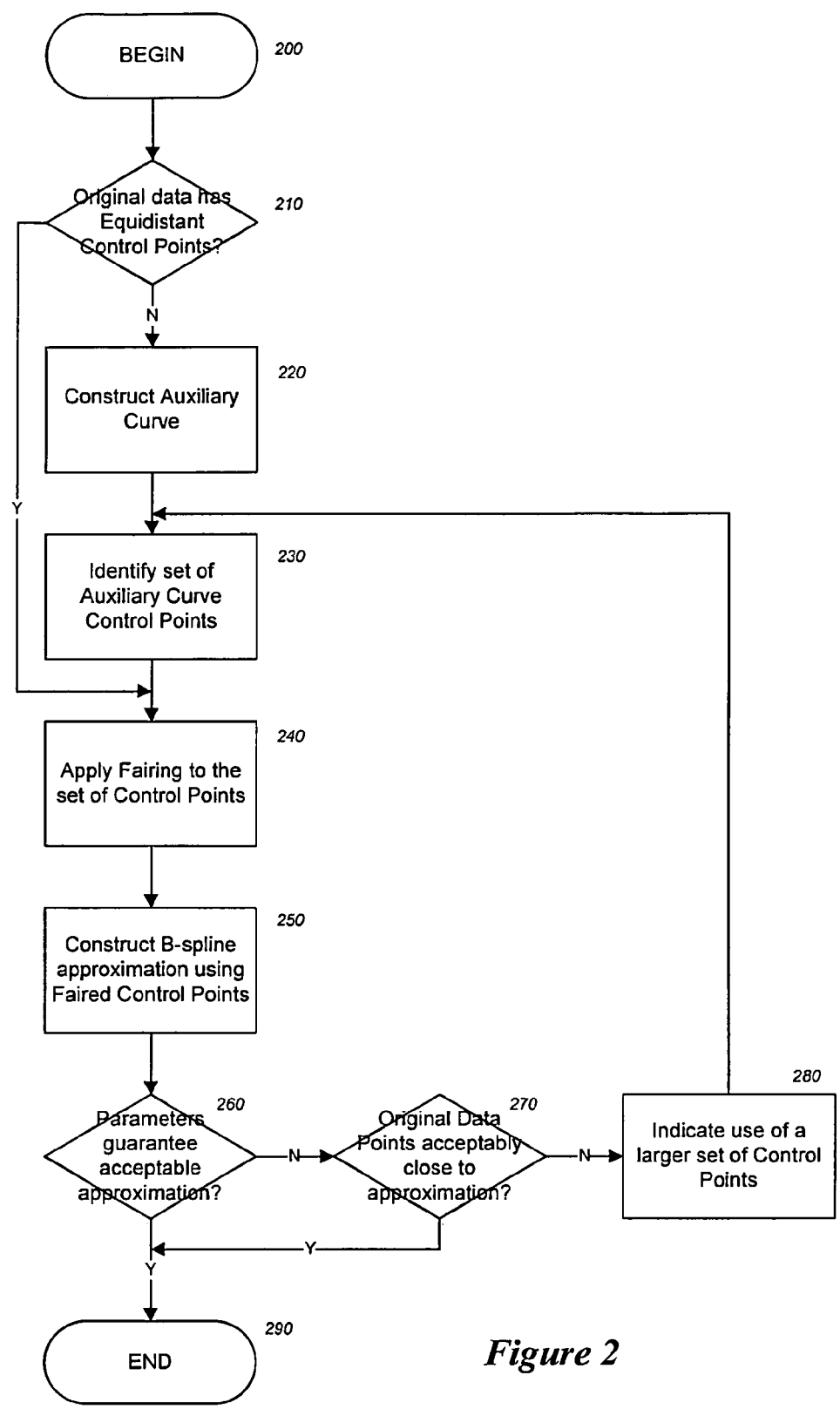
FIG. 2 is a flowchart showing determination of a target trajectory.

FIG. 2 is a flowchart showing determination of a target trajectory. Again, in one preferred embodiment the determination of the target trajectory is performed by software controlled processing logic such as 150 of FIG. 1. Software for the process may further be advantageously stored on portable media such as CD-ROM or flash memory drives for, e.g., distribution or field installation. The software and related electronic processing logic may further be advantageously constructed together as an electronic navigation device for utilization in a vehicle as that described in reference to FIG. 1. Now, the flow of the target trajectory determination process will be generally described in relation to FIG. 2. Then, a more detailed discussion of certain operations follows.

An initial determination is made at block 210 whether the model trajectory contains data points that are equidistant. If not, an auxiliary curve is constructed at block 220 that adequately approximates the model trajectory in terms of distance, i.e., proximity of the model path and the auxiliary curve. This auxiliary curve need not meet all of the desired characteristics of an admissible path, such as smoothness or curvature radius. At block 230, a set of equidistant control points are then selected from the auxiliary curve resulting in an auxiliary trajectory. By this point, a trajectory having equidistant control points exists regardless of the determination made at block 210, and processing moves to block 240 (recall that the data points of the model trajectory are its control points).

At block 240, fairing is applied to the trajectory having equidistant control points to reduce or eliminate the effect of measurement error, resulting in a faired trajectory. At block 250, a target trajectory is constructed from the faired trajectory data. Given the starting parameters used in preceding processes it may be known a priori that the target trajectory constructed at block 250 meets all criteria of acceptability. This question is asked at block 260 and, if so, construction of the target trajectory is complete. If not, a determination is made at block 270 whether the target trajectory acceptably comports with the starting model trajectory present at block 210. If so, construction of the target trajectory is complete. If not, recalculation using a larger set of control points is instituted at block 280, and processing returns to block 230 for repetition of processing as described above, this time using a larger set of control points. Ultimately, an acceptable target trajectory results at block 290.

Note that the decision on whether to proceed to block 270 from block 260 depends on some a priori given parameters, such as the number of data points and measurement errors, and requirements on the accuracy of the desired approximation. The upper estimate of the maximum deviation of the constructed approximation from the actual path as a function of the a priori and selected parameters is given below. If one can select parameters such that this bound is less than the desired accuracy of the approximation, progression to block 270 is not required. Otherwise, it is required to check whether the actual maximum deviation is acceptable since the upper estimate obtained is too conservative and the actual maximum deviation can be considerably smaller.

Construction of the Auxiliary Curve

Since the control points used for constructing the resulting target trajectory (at 250 of FIG. 2) are selected on the auxiliary curve (at 230 of FIG. 2) in one embodiment, the paramount consideration for the auxiliary curve is its position-wise closeness to the model trajectory.

In one embodiment of this invention, the auxiliary curve is a piece-wise linear curve consisting of segments of straight lines connecting two neighboring data points. This curve likely does not meet the smoothness requirements; however, it can provide a good approximation of the model path if the number of data points is large. Let $S_0$ denote the maximum distance between two neighboring data points, and $K_m$ be the maximum curvature of the path to be approximated (if no a priori information about the trajectory is available, $K_m$ may be set equal to $k_{max}$, where $k_{max}$ is calculated from the minimum steering radius of the vehicle traveling the target trajectory). Then, the distance of any point of the auxiliary curve from the model path is less than $\delta_0$ (assuming exact measurements), where $$\delta_0 = \frac{S_0^2 K_m}{2}.$$

For typical surface vehicles, by taking data points at a distance about half a meter, the maximum deviation $\delta_0$ of the auxiliary curve from the model path may be as small as 1-5 cm (depending on the maximum curvature of the particular path). In view of the above, there are no theoretical limitations on the number of points in the original set. The greater the number of points in the set, the better the auxiliary approximation that results.

Other types of the auxiliary curves can be used as well. The choice of the curve type may depend on specific features of the particular application. For example, in another embodiment of this invention, B-spline approximation is used to construct the auxiliary curve. In this case, the auxiliary curve may satisfy the desired smoothness of an admissible path. Measurement errors and non-uniformity of data distribution, however, may prevent the B-spline approximation from satisfying other characteristics of an admissible path. Nonetheless, a B-spline approximation can result in a usable auxiliary curve.

Selection of Auxiliary Control Points

The control points of the auxiliary trajectory are selected from the auxiliary curve as points dividing this curve into segments of approximately equal length (at 230 of FIG. 2) (within, e.g., +/−5% of each other in length). The parameter to select at this stage is the distance $S_1$ between two neighboring control points (which determines the number of segments along the curve). This parameter affects the maximum deviation of any control point from the B-spline constructed by these points, which is given by $$\delta_1 = \frac{S_1^2 K_m}{6}.$$

By setting $\delta_1$ equal to the maximum admissible deviation, $S_1$ is found from the above equation. Smaller values of $S_1$ will result in better approximation, but, at the same time, will increase the effect of errors in the coordinates of control points.

Fairing of the Auxiliary Trajectory

It is instructive to consider $\delta_m$ as a measurement error (for this example, $\delta_m$ is the standard deviation of the data point measurement error multiplied by the reasonable scale factor of 3). Then, the errors of control points (possible deviations of the control points from the actual path) are generally greater than $\delta_m$ and can be estimated as $\delta_m + \delta_0$. This error would badly affect the B-spline approximation if constructed directly by these points. To reduce or avoid the effect of errors in the control points, the preferred embodiment applies a fairing procedure to the control points of the auxiliary trajectory. Any fairing procedure is based on introducing some functional (fairing criterion) that takes its minimum values on "good" (fair) curves. Clearly, an actual trajectory satisfies all smoothness requirements and, thus, is fair. Thus, unfairness of the approximate B-spline curve is solely due to errors in the control points. A desired curve can then be found by letting coordinates of the control points vary within a prescribed neighborhood of a small radius and comparing values of the functional on the corresponding B-spline curves. Its value is selected approximately equal to the estimated error in the coordinates of the control points; e.g., in the case of piece-wise linear approximation used at block 220, this radius may be taken equal to $\delta_m + \delta_0$ (estimated deviation of a control point from the actual path). One skilled in the art recognizes that a variety of fairing criteria and strategies of the control point variation could be used in the framework of an inventive embodiment and that particulars discussed herein are representative embodiments.

In one embodiment, a local fairing algorithm based on the energy fairing criterion is used (Eck, M. and Hadenfeld, J., Local Energy Fairing of B-Spline Curves, *Computing Supplementum* 10, *Geometric Modelling*, pp. 129-147, Springer, 1995). In this algorithm, the integral of the squared curvature with respect to the curve length is minimized, and the curvature is assumed to be approximately equal to the absolute value of the second derivative $\ddot{r}^{(i)}(t)$ with respect to the parameter t (this assumption is fulfilled by virtue of the fact that the selected auxiliary control points are equidistant).

In another preferred embodiment, the global fairing algorithm based on the minimization of the sum of jumps of the third derivative with respect to t is advantageously employed. The use of such a fairing criterion is justified by the fact that unfairness of the shape of a B-spline curve results from discontinuities of the third derivatives (the lower-order derivatives are continuous) with respect to t at the points where two adjacent elementary B-splines are connected. Moreover, since the control points are equidistant at the point in the process where fairing is performed, it is sufficient to vary control point locations only in the normal directions to the spline, which simplifies the fairing problem. Explanation and details of this preferred global fairing process and its foundations are next discussed.

In view of the uniformity of the control points distribution, the derivative with respect to the arc length can be replaced by the derivative with respect to the spline parameter t. Differentiating both sides of Formula 1 three times and using Formula 2, produces the constant third derivative of the elementary spline $$\ddot{r}^{(i)} = -r_{i-1} + 3r_i - 3r_{i+1} + r_{i+2}$$

Hence, the jump of the third derivative at the connection point of two elementary splines is found in terms of the control points as $$\Delta \ddot{r}_i \equiv \ddot{r}^{(i)} - \ddot{r}^{(i-1)} = r_{i-2} - 4r_{i-1} + 6r_i - 4r_{i+1} + r_{i+2}. \quad \text{Formula (4)}$$

Since the error in the control point location along the curve does not significantly affect its shape, the points are allowed to vary only in the normal direction and projections of the jumps of the third derivative onto these normals are observed. Namely, the quantities $$F_i \equiv (\Delta \ddot{r}_i, N_i) = (r_{i-2}, N_i) - 4(r_{i-1}, N_i) + 6(r_i, N_i) - 4(r_{i+1}, N_i) + (r_{i+2}, N_i) \quad \text{Formula (5)}$$

are calculated, where $N_i$ is the normal to the B-spline curve at the point of connection of the ith and (i+1)th elementary splines. Given a set of control points, the normal $N_i$ can be computed (without constructing the spline curve) as the unit-length vector perpendicular to the slope, which is determined by two adjacent control points. It is instructive to consider the present method in terms of a mechanical analogy where $F_i$ may be considered and discussed as "shear forces." In order that Formula (5) be applicable for calculation of forces at all connection points, including the curve endpoints, it is required to add two points (denoted as $r_{-1}$ and $r_0$) before the beginning point in the original data set and two points after the last one, which can be done in different ways. In one embodiment, two pairs of the additional points are selected to lie on the direct lines connecting two first and two last points of the original set, respectively. That is, $$r_{-1} = 3r_1 - 2r_2, r_0 = 2r_1 - r_2$$

and $$r_{n+1} = 2r_n - r_{n-1}, r_{n+2} = 3r_n - 2r_{n-1}.$$

The normals $N_{-1}$ and $N_0$ to the curve at the first two additional points are parallel to $N_1$, and the normals at the last two points are parallel to $N_n$. Thus, the forces $F_i$ are defined for all i from 1 through n.

An embodiment may advantageously include processing logic that conducts the global fairing process using a quadratic form. Here, $\epsilon_i$ denotes variation of the ith control point $r_i$ along the normal $N_i$. The new locations of the control points are given by $$\tilde{r}_i = r_i + N_i \epsilon_i. \quad \text{Formula (6)}$$

Substituting $\tilde{r}_i$ for $r_i$ into Formula (5) and taking into account that $N_i$ are normalized to unity, results in $$F_i(\epsilon) = F_i(0) + (N_{i-2}, N_i)\epsilon_{i-2} - 4(N_{i-1}, N_i)\epsilon_{i-1} + 6\epsilon_i - 4(N_{i+1}, N_i)\epsilon_{i+1} + (N_{i+2}, N_i)\epsilon_{i+2}, \quad \text{Formula (7)}$$

where $F_i(0)$ are "shear forces" corresponding to zero variations of the control points, which are given by Formula (5). Only original control points are allowed to vary. Formula (7) is made valid for all i=1, . . . , n, by setting $\epsilon_{-1} = \epsilon_0 = \epsilon_{n+1} = \epsilon_{n+2} = 0$.

Introducing vector notation $\epsilon = [\epsilon_i, \ldots, \epsilon_n]^T$, $F(\epsilon) = [F_i(\epsilon), \ldots, F_n(\epsilon)]^T$, Formula (7) can be representing in the matrix form as $$F(\epsilon) = F(0) + C\epsilon; \quad \text{Formula (8)}$$

where C is the five-diagonal symmetric matrix $$C = \begin{pmatrix} 6 & -4c_{12} & c_{13} & 0 & 0 & 0 & \cdots \\ -4c_{21} & 6 & -4c_{32} & c_{24} & 0 & 0 & \cdots \\ c_{31} & -4c_{32} & 6 & -4c_{34} & c_{35} & 0 & \cdots \\ 0 & c_{42} & -4c_{43} & 6 & -4c_{45} & c_{46} & \cdots \\ 0 & 0 & c_{53} & -4c_{54} & 6 & -4c_{56} & \cdots \\ 0 & 0 & 0 & c_{64} & -4c_{65} & 6 & \cdots \\ \vdots & \vdots & \vdots & \vdots & \vdots & \vdots & \ddots \end{pmatrix}, \quad \text{Formula (9)}$$

and $c_{ij} = (N_i, N_j)$ is the inner product of two normals.

Minimization of the jumps of the third derivatives reduces to minimization of the quadratic functional $\|F(\epsilon)\|^2$, where $\|\bullet\|$ denotes the Euclidean vector norm. Using Formula (8), and introducing the notation $$H = C^T C, f = C^T F(0), \quad \text{Formula (10)}$$

where H is positive definite, and dropping the free term, the desired quadratic functional is represented in the standard form as $$\Phi(\varepsilon) = \frac{1}{2}\varepsilon^T H \varepsilon + f^T \varepsilon \quad \text{Formula (11)}$$

The stated goal of the fairing procedure is to try to reduce or eliminate measurement errors inherent in the control points. The presently described embodiment imposes the following interval constraint on the control point variation: $|\epsilon_i| \leq \delta$, where $\delta = \delta_m + \delta_0$.

The result is the following quadratic programming problem with simple constraints:

$$\text{Find } \min_{\varepsilon} \Phi(\varepsilon), \varepsilon \in R^n,$$

under constraints $-\delta \leq \epsilon_i \leq \delta$.

The global fairing method just discussed has the advantage that all control points are subjected to variation simultaneously, and the fairing problem reduces to a minimization process that may be conducted using well known means. The global minimum of the quadratic functional is found and advantageously stored in electronic memory by processing logic that implements any efficient standard method (e.g., the so-called active set method). One of skill in the art will see that processing logic for the discussed global fairing method has the advantage of being easy to implement. Given a set of control points, the fairing consists in a single solution of the quadratic programming problem with simple inequality constraints on the variables. The required matrix and vector are easily calculated by formulas (5), (9), and (10). No iterations are involved. The resulting B-spline curve constructed by the faired points $\tilde{r}_i$ is fairer than that constructed by the original control points, since its third derivative has smaller jumps.

Embodiments employing the global fairing method described above can additionally employ options to facilitate the handling of large trajectories, i.e., long paths. Use of these options can result in advantageous reductions in processing time and memory consumption. First, advantage can be taken of the special structure of matrices C (Formula (9)) and H. Since H is a band (nine-diagonal) matrix, the processing logic for solving the quadratic programming problem can be specialized for this particular matrix type. In view of sparsity of this matrix, the performance gain can be tremendous. Second, the problem can be decomposed into several smaller subproblems by dividing the overall path into several segments, accurately selecting boundary conditions for individual segments, and applying the fairing procedure to these segments separately. The resulting curve is very close to the optimal one and differs from the latter only in small regions surrounding boundary points of the separate segments.

Construction of the Target Trajectory (B-Spline Approximation)

The resulting target trajectory, a B-spline approximation, is easily constructed with the use of uniform elementary B-splines by the formulas given previously. In order to construct all elementary B-splines of an approximated target path, one employs the 2-by-4×n matrix R consisting of n blocks (2-by-4 matrices) obtained by multiplying matrices $R_i$ by M, $R_1=[R_1M, R_2M, \ldots, R_nM]$. Then, to obtain the value of the ith elementary spline for any t, the ith block $R_iM$ of the matrix R is multiplied by the vector T(t). Thus, the calculation of the matrix R establishes a base for the approximation.

To calculate a distance function when using the target trajectory in a control algorithm, additional information is employed. Namely, the following two arrays—the 2-by-n array $X^C=[X_1^C, \ldots, X_n^C]$ and the one-dimensional array $\Phi=[\Phi_1, \ldots, \Phi_n]$—are calculated and preferably stored. These values are characteristic of n instantiations of a geometric model described below.

Figure 3:
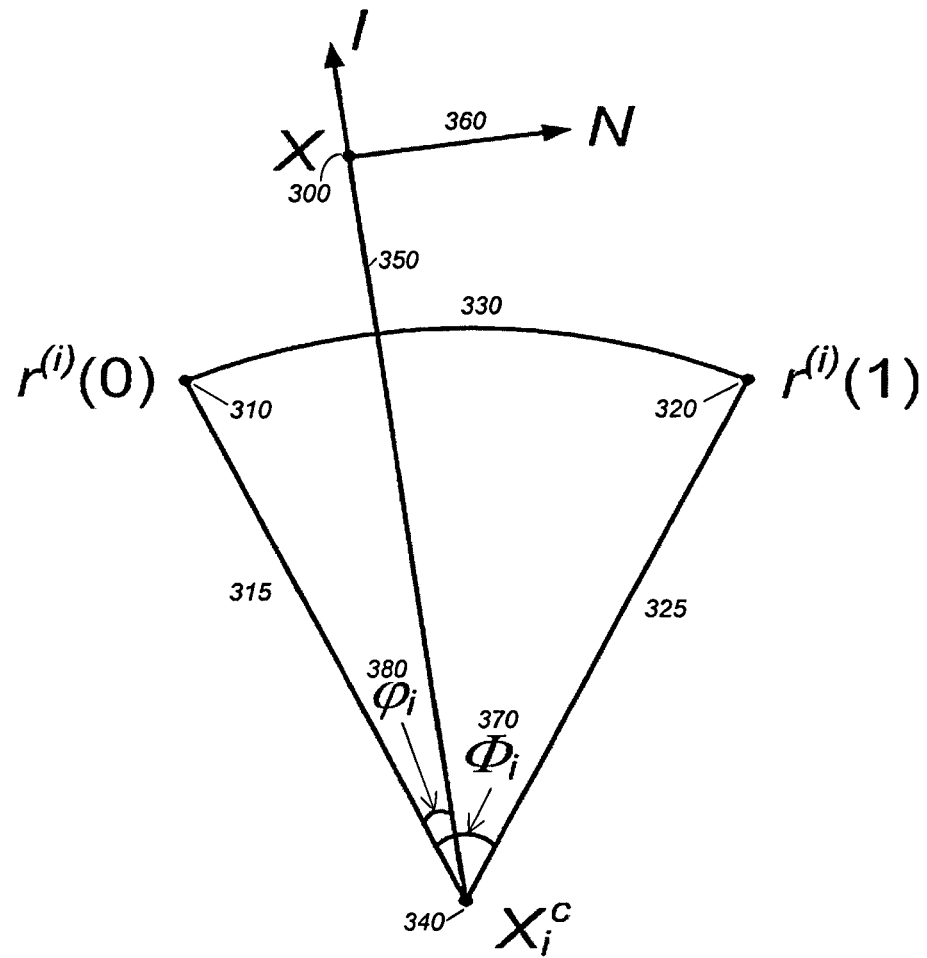
FIG. 3 is a diagram showing geometric model elements useful in automatic navigation aspects of the present invention.

FIG. 3 is a diagram showing geometric model elements useful in automatic navigation aspects of the present invention. Values characteristic of this geometric model that are calculated or stored into memory or register circuits of a computer or other processing logic are advantageously employed to determine the deviation of a vehicle from its target path. Such directional control signal information is useful to effect steering control to direct the vehicle onto and along the target path. Looking to FIG. 3, the point $X_i^C$ 340 is the intersection of the two straight lines 315, 325 that are normal to the ith spline 330 at the beginning 310 and the endpoint 320 of the spline, and $\Phi_i$ 370 is the angle between these two lines. If the ith spline is a segment of a straight line (the segment is considered straight if the scalar product of the unit tangent vectors at the beginning and end of the elementary spline lies in the interval [1, 1−e], where e is a preassigned small number as discussed later), then both coordinates of the point $X_i^C$ are set equal to infinity and $\Phi_i$ is set equal to the length of the segment.

The upper bound of the maximum deviation of the constructed (target) and actual paths can be estimated as $\epsilon_S=2\delta_m+2\delta_0+\delta_1$. This is a very conservative estimate, which assumes that the a priori errors and those introduced in each approximation step are added. In particular, the aim of the fairing is to compensate or remove measurement errors. However, the above estimate assumes that the deviation of the control point from the actual path increases after the fairing. Thus, the actual maximum deviation of the path constructed from the actual path is expected to be significantly smaller.

Verification of the Approximation Accuracy

If the upper bound of the maximum deviation $\epsilon_S$ is greater than the desired approximation accuracy, one can find the actual maximum deviation, which is found as follows. For each data point from the model trajectory, find the distance from this point to the target trajectory. The distance is easily found by means of the distance function introduced below and described in relation to its use during automatic vehicle navigation. The actual maximum deviation is found as the maximum of these distances.

Measuring Distance to a Target Path

The distance function d(X) from a point X 300 to the ith elementary B-spline curve 330 of the target trajectory is described below. The distance function is useful in calculations used to effect control of the automated steering of a vehicle such as that described earlier in relation to FIG. 1. In such use, the distance function can be used to compare the instant vehicle position with the desired position on the target path. Referring again to FIG. 3, the points X 300 and $X_i^C$ 340 are connected by the straight line 350 and denote by l the unit vector directed along this line, as shown in FIG. 3. The positive direction of l corresponds to the direction of the normal to the spline at the point of the intersection of the line $X_i^CX$ with the spline. $\phi_i$ 380 denotes the angle between the line $X_i^CX$ and the line directed from the center $X_i^C$ to the beginning of the ith spline 315. If the ith spline curve is straight, $\phi_i$ is defined to be the distance of the projection of the point X onto the spline from the beginning point $r^{(i)}(0)$ of the spline. The distance function d(X) is defined as $$d(X)=\langle X-r^{(i)}(t_x), l \rangle, \quad \text{(Formula 12)}$$

where $\langle \cdot, \cdot \rangle$ denotes the scalar product of two vectors, $$t_X = t_X^0 + \Delta t_X, t_X^0 = \frac{\varphi_i}{\Phi_i},$$

$$\Delta t_X = \frac{\langle X - r^{(i)}(t_X^0), N \rangle}{\langle \dot{r}^{(i)}(t_X^0), N \rangle}, \quad \text{(Formula 13)}$$

and N is the unit normal vector 360 to the line $X_i^CX$. Note that, when the parameter t varies uniformly, the corresponding point $r^{(i)}(t)$ moves along the spline with a variable speed depending on the instant curvature of the spline, and the correction term $\Delta t_x$ is introduced in order to take into account this fact and to bring the point $r^{(i)}(t_x)$ closer to the point of intersection of the line $X_i^CX$ with the spline. In the case of a straight spline, the point $r^{(i)}(t)$ moves along the spline uniformly, and the correction term is zero. Thus, d(X) is approximately equal to the deviation value or distance of the point X from the spline measured along the line $X_i^CX$.

The distance from a point X 300 to the trajectory is defined as the distance d(X) from X to the closest elementary B-spline curve, which is referred to as the current spline. Since the vehicle position X varies with time, the data integration and processing logic system for directional control (150 of FIG. 1) needs to know the number of the current spline at any moment of time. Assuming that the numbering of the splines is agreed with the order of their passing, the current spline with number i is replaced by the spline with number i+1 when the parameter $\phi_i$ becomes equal to $\Phi_i$ ($t_x^0=1$). The number of the first current spline is determined by the vehicle location at the initial moment.

By reviewing the foregoing matter, one skilled in the art will appreciate the advantages offered by varied aspects of the present invention. Further one can appreciate that the foregoing matter recites specific details and discusses particular embodiments in order to convey an understanding of the invention. One skilled in the art recognizes that alternative details and embodiments can be employed without departing from the inventive aspects. For example, inventive aspects could be employed to steer a second vehicle following a first, where the second vehicle receives model path data by telemetry from the first, and progressively generates target trajectory information, finally able to produce a single target trajectory for the entire followed path at the completion of the route if desired. One further understands that aspects of the invention are not limited to the particular applications discussed. For example, aspects of the invention can be advantageously employed with aerial spraying vehicles for municipal insect abatement programs or with unmanned autonomous vehicles (UAVS) deployed in hazardous settings.

What is claimed is:

1. A computer-implemented method for generating a planar trajectory for use by a vehicle in guiding its position, the method comprising:
   (a) determining whether a plurality of points representing the trajectory are at least substantially equidistant;
   (b) if the plurality of points are determined to not be at least substantially equidistant:
       generating an auxiliary curve approximating the trajectory;
       identifying a plurality of substantially equidistant points from the auxiliary curve; and
       fairing the identified plurality of substantially equidistant points to generate a plurality of faired points;
   (c) if the plurality of points are determined to be at least substantially equidistant, fairing the plurality of points to generate the plurality of faired points; and
   (d) computing by a processor, a plurality of polynomial segments from the plurality of faired points, wherein the polynomial segments form a curve representing the trajectory, the curve is $C^2$-smooth, and the curve does not exceed the steering capability of the vehicle.

2. The method of claim 1, wherein the polynomial segments comprise cubic B-spline segments.

3. The method of claim 1, wherein distances between neighboring points of the plurality of substantially equidistant points are within 5% of each other.

4. The method of claim 3, wherein the polynomial segments comprise cubic B-spline segments.

5. The method of claim 1, further comprising:
   identifying a segment associated with a current position;
   computing a trajectory deviation value based upon a distance of the current position from the segment; and
   providing a course correction signal for the vehicle based upon the trajectory deviation value.

6. The method of claim 5, wherein computing the trajectory deviation value comprises:
   identifying coordinates of the current position;
   computing the trajectory deviation value associated with the distance of the current position from the associated segment based upon a point of intersection between the normals of the endpoints of the segment and a line projected between the current position and the point of intersection.

7. A non-transitory computer-readable storage medium comprising computer-executable instructions for representing a planar trajectory for use by a vehicle in guiding its position, the instructions for:
   (a) determining whether a plurality of points representing the trajectory are at least substantially equidistant;
   (b) if the plurality of points are determined to not be at least substantially equidistant:
       generating an auxiliary curve approximating the trajectory;
       identifying a plurality of substantially equidistant points from the auxiliary curve; and
       fairing the identified plurality of substantially equidistant points to generate a plurality of faired points;
   (c) if the plurality of points are determined to be at least substantially equidistant, fairing the plurality of points to generate the plurality of faired points; and
   (d) computing a plurality of polynomial segments from the plurality of faired points, wherein the polynomial segments form a curve representing the trajectory, the curve is $C^2$-smooth, and the curve does not exceed the steering capability of the vehicle.

8. The computer-readable storage medium of claim 7, wherein the polynomial segments comprise cubic B-spline segments.

9. The computer-readable storage medium of claim 7, wherein distances between neighboring points of the plurality of substantially equidistant points are within 5% of each other.

10. The computer-readable storage medium of claim 9, wherein the polynomial segments comprise cubic B-spline segments.

11. The computer-readable storage medium of claim 7, further comprising instructions for:
    identifying a segment associated with a current position;
    computing a trajectory deviation value based upon a distance of the current position from the segment; and
    providing a course correction signal for the vehicle based upon the trajectory deviation value.

12. The computer-readable storage medium of claim 11, wherein computing the trajectory deviation value comprises:
    identifying coordinates of the current position;
    computing the trajectory deviation value associated with the distance of the current position from the associated segment based upon a point of intersection between the normals of the endpoints of the segment and a line projected between the current position and the point of intersection.

13. A navigation apparatus for use with a vehicle, the apparatus comprising:
    the computer-readable medium of claim 7;
    processing logic for executing instructions stored on the computer-readable medium; and
    a directional control apparatus for controlling the direction of vehicle movement based upon the curve formed by the computed segments.

14. A vehicle for following a trajectory, the vehicle comprising:
    the navigation apparatus of claim 13;
    a navigation signal receiver coupled to the processing logic; and
    an inertial sensor coupled to the processing logic.

* * * * *